United States Patent [19]

Brimo, II

[11] Patent Number: 5,346,088

[45] Date of Patent: * Sep. 13, 1994

[54] REUSABLE BEVERAGE CAN CAP

[76] Inventor: Joseph Brimo, II, 724 Johns La., Ambler, Pa. 19002

[ * ] Notice: The portion of the term of this patent subsequent to Jun. 22, 2010 has been disclaimed.

[21] Appl. No.: 80,411

[22] Filed: Jun. 21, 1993

Related U.S. Application Data

[63] Continuation-in-part of Ser. No. 977,892, Nov. 18, 1992, Pat. No. 5,221,020.

[51] Int. Cl.5 .............................................. B65D 43/08
[52] U.S. Cl. .................................... 220/357; 220/354; 220/694; 220/729
[58] Field of Search ................ 215/343, 344, 345, 346, 215/347, 350, 351, 354, 364; 220/308, 352, 353, 354, 355, 356, 357, 694, 729, 739, 740, 903; 248/346.1

[56] References Cited

U.S. PATENT DOCUMENTS

| | | | |
|---|---|---|---|
| 2,817,453 | 12/1957 | Stover | 215/346 |
| 2,817,454 | 12/1957 | Stover | 215/346 |
| 4,984,703 | 1/1991 | Burzynski | 215/350 |
| 5,221,020 | 6/1993 | Brimo, II | 220/357 |

Primary Examiner—Allan N. Shoap
Assistant Examiner—Nova Stucker
Attorney, Agent, or Firm—John W. Logan, Jr.

[57] ABSTRACT

The invention disclosed is a reusable cap adapted to hermetically seal the top of a standard beverage can so as to contain the carbonation within the can and to prevent spills. The cap comprises a flat topped resilient outer shell, and an elastomeric inner member adapted to mate with the entire recessed top of the can to form a liquid and airtight seal.

6 Claims, 3 Drawing Sheets

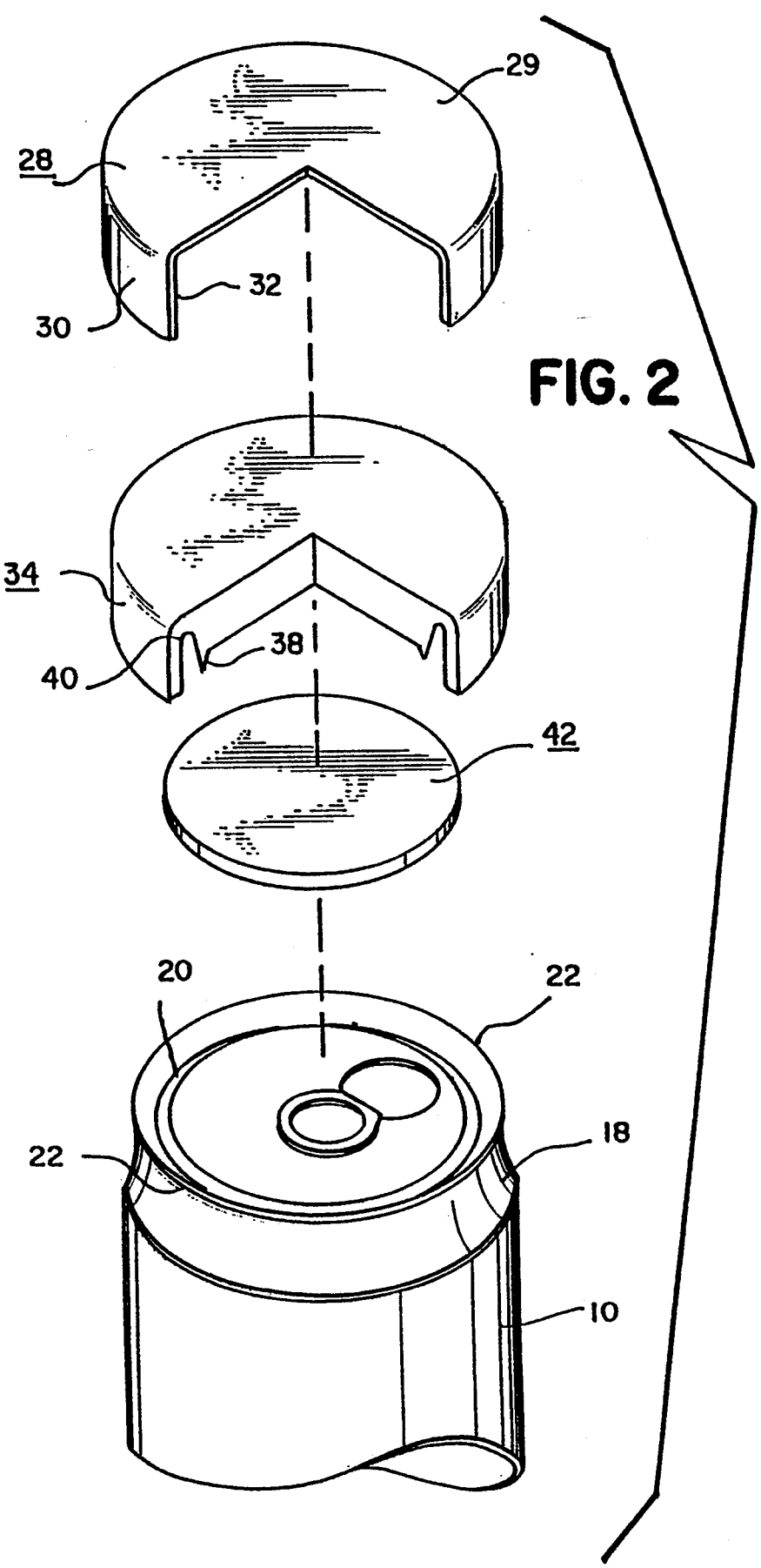

REUSABLE BEVERAGE CAN CAP

This application is a continuation-in-part of co-pending U.S. patent application Ser. No. 977,892 filed Nov. 18, 1992, now U.S. Pat. No. 5,221,020.

BACKGROUND OF THE INVENTION

1. Field of the Invention

The present invention relates to caps for beverage cans and similar containers. More particularly, the present invention provides a reusable cap to contain and preserve the unserved portion of the contents in a beverage can.

2. Description of Prior Art

As is well known, carbonated beverages such as beer and soda are regularly dispensed in fliptop cans made from aluminum and/or similar materials. Access to the container is achieved by a top adapted to be punctured by a tab affixed to the top. Sometimes, only part of the contents are served at one time and it is desirable to preserve the remaining contents in the can. Unfortunately, conventional cans provide no mechanism to close the opening once it is established. Accordingly, open cans are prone to a variety of problems, including loss of carbonation, spillage, and access by insects or debris.

As a result of these deficiencies, a number of various caps have been proposed to contain and/or preserve the contents of a beverage can. Although some of these existing caps may function adequately well for certain limited purposes, none is believed to be fully satisfactory.

For instance, U.S. Pat. No. 5,105,964 to Heath provides a cap to be installed at the factory prior to distribution for the purpose of maintaining the drinking area of the can in a sanitary condition prior to consumption by the consumer. While this cap may be used to recover an opened beverage can to save the remaining contents for future consumption, it makes no provision for a hermetic seal required to maintain the beverage in its original form.

Similarly, U.S. Pat. No. 3,527,375 to Klein discloses a container cap for temporary preservation of the unserved contents in an opened can. While this cap provides some means to prevent the escape of gas, it is considered inadequate for anything but short-term storage. Additionally, this patent employs a substantial dead-air space which, when used with its proposed resilient material, allows for deformation of the cap by the buildup of internal pressure on the inside of the can. The presence of dead-air space also leaves open the prospect of inadequate liquid containment and spillage upon removal of the cap.

U.S. Pat. Nos. 5,123,558 to Moloney and 5,125,525 to Tucker, also disclose caps for beverage containers. Moloney discusses a combination cap and coaster and Tucker discloses a cap with a hinged lid to prevent contamination of the contents from airborne debris or insects. While both of these caps may function adequately well for their stated purposes, neither effectuates an airtight seal to prevent the escape of gas. Thus, the unused contents may only be preserved for a short time before becoming "flat."

My prior co-pending application teaches a beverage can cap comprising a hard outer shell, a resilient inner liner, and an elastomeric liner which fits over the top of a beverage can and provides a liquid and airtight seal with no dead air space between the cap and the can.

While this cap works adequately well, it has been determined that the outer shell and the liner may be manufactured as a single piece if desired.

Accordingly, it is an object of the present invention to provide a beverage can cap which is capable of forming a substantially hermetic seal, without any dead air space between the cap and the can, to maximize preservation of the can contents and minimize the possibility of inadvertent spillage.

It is an another object of the present invention to provide a beverage cap which is easy to install and maintain in sealing contact with the beverage can, and is also easy to remove.

Another object of the present invention is to provide a beverage cap which is attractive and provides a sufficiently large outside surface area for use with promotion or advertising.

A further object of the present invention is to provide a beverage can cap which is both simple and inexpensive to manufacture, and may be constructed from materials suitable for washing and reuse.

These and other objects and advantages of the present invention will become apparent from the consideration of the following description and drawings.

SUMMARY OF THE INVENTION

The present invention provides an improved cap for beverage cans and similar containers which is both easy to use and provides an exceptional seal to contain and preserve the contents of the can. The cap of the present invention comprises an outer shell and an inner gasket designed to fit snugly to the top of a beverage can by enshrouding the bead on the rim of the can, and further, to mate to the entire recessed top of the can, so that there is no dead air space between the cap and the can, thus forming a tight seal for both liquid and gas. This positive seal allows the beverage remaining in the can to be preserved in its original form for extended durations of time. The substantially flat top of the outer shell also provides an ideal surface for promotional advertising.

The cap can be forcibly pushed down into sealing position on a standard beverage can by placing the cap on top of the can, such that an inner annular groove on the cap is aligned overtop the beaded rim of the can, and then forcibly pushing the cap in a downward direction until the compression sensitive inner gasket of the cap comes in sealing contact with the recessed top of the can. The cap is removable by holding the can firmly in place with one hand and then gripping the cap with the fingers of the other hand, with the palm of the hand placed against the opposite side of the top than that side being gripped by the fingers, and pulling up with the fingers.

BRIEF DESCRIPTION OF THE DRAWINGS

The apparatus of the present invention should become apparent from the following description when considered in conjunction with the accompanying drawings, in which:

FIG. 2 is an exploded cross sectional side view, partially in section, of the component parts of one embodiment of the present invention.

DETAILED DESCRIPTION OF THE INVENTION

Figure 1:
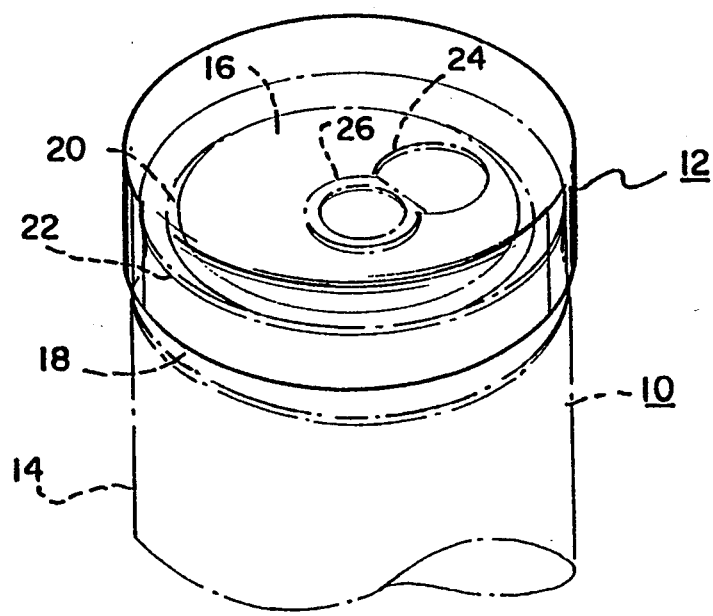
FIG. 1 is a perspective view of a beverage container having a cap of the present invention installed thereon.
Figure 3:
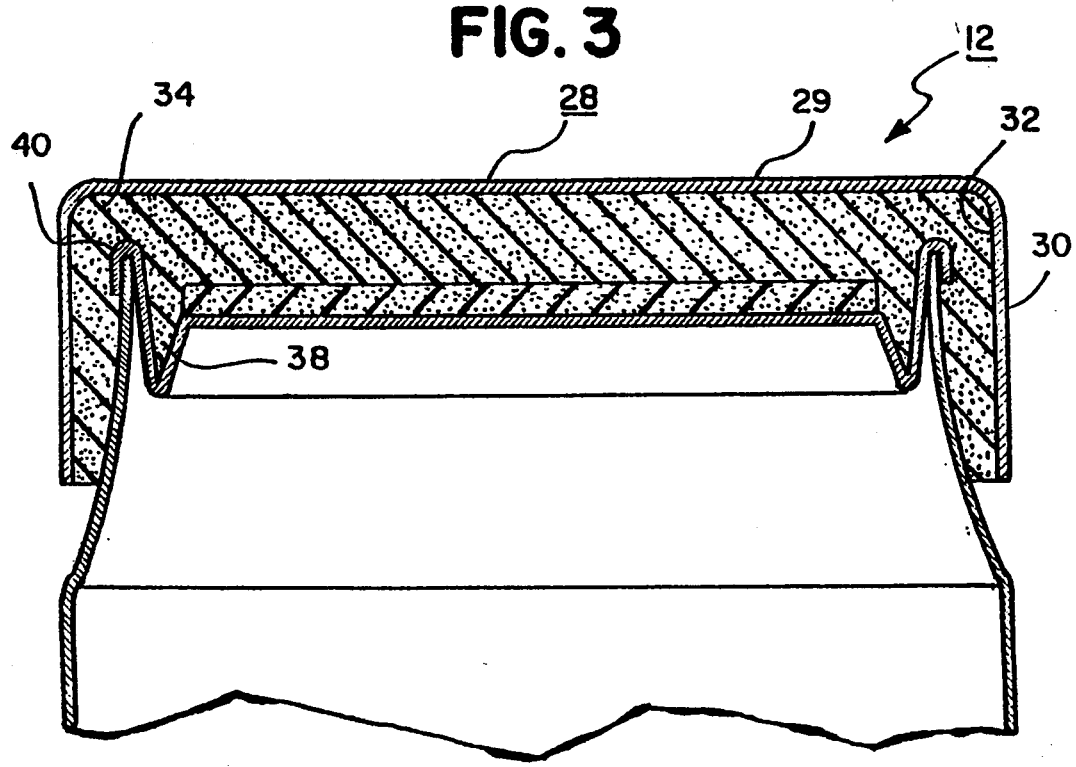
FIG. 3 is a cross-sectional side view of the present invention.

The present invention provides an improved cap for sealing and preserving the contents of a beverage can or similar container. FIGS. 1 through 4 illustrate a standard aluminum beverage can 10 and a cap 12 of the present invention. The can 10 has a vertical sidewall 14 and a recessed top surface 16. The upper portion 18 of the sidewall 14 is tapered to provide a suitable place for a consumer to place her lips, allowing direct access to the beverage contained therein.

The recessed top 16 is surrounded by an annular groove 20 before joining with the tapered upper sidewall 18, the juncture thereof forming a beaded rim 22. Additionally, the beverage can top is equipped with a snap opening 24 including a punch key 26 riveted to the center of the top 16.

The cap 12 comprises an outer shell 28 having a top surface 29, an outer peripheral side 30, and an inner sidewall 32. The side 30 of shell 28 is approximately equal in size to two-thirds the length of tapered portion 18 of sidewall 14 or approximately 0.85 cm. and the diameter of the top 29 is approximately equal to the diameter of the can 10 at its widest part, or approximately 7 cm. This allows for cans installed with lids thereon to be stacked very efficiently. Additionally, top 29 is flat and provides an ideal venue for the addition of trademarks, promotions and advertising.

A compression sensitive liner 34 is affixed to the inside of shell 28. The compression sensitive liner 34 is designed so that it covers the entire interior of the shell 28. Further, liner 34 has an annular inner flange 38 of approximately the same diameter as annular inner groove 20 in can top 16. The annular flange 38 is designed to mate with and fill annular groove 20 on the inside rim of the can 10. Additionally, annular flange 38 and the outer portion 36 of the liner 34 affixed to the inside peripheral wall 32 of the shell 28, together form a groove 40 in liner 34. This groove 40 is adapted to receive and mate to the beaded rim 22 of the can 10. The distance between inner flange 38 and outer portion 36 of liner 34 is slightly narrower than the thickness of beaded rim 20. The height of the inner flange 38 is substantially equal to the depth of the groove 20 on the can as measured from the top of beaded rim 22, so that when the cap 12 is placed over the can 10, it not only enshrouds the beaded rim 22, but also completely fills inside annular groove 20 of recessed top 16. Thus, the liner 34 comes in sealing contact with the entire top 16 of the can 10.

Since the standard beverage can 10 does not provide any mechanism or device for closing the can once opened, the cap 12 is designed to be removably attached to the can 10 in order to preserve any unconsumed beverage remaining in the can, by snapping over and enshrouding beaded rim 22 until the compression sensitive liner 34 comes in sealing contact with the recessed top 16 of can 10. Once installed, the cap 12 is in sealing contact with the can top 16, annular groove 20, and beaded rim 20. The outer periphery 30 of cap 12 extends below beaded rim 22 approximately half way down tapered sidewall 18. The shell 28 is designed of material strong enough to insure that the cap 12 is impervious to any deformation from the pressure forces exerted against it by the release of gases within the can 10.

Figure 4:
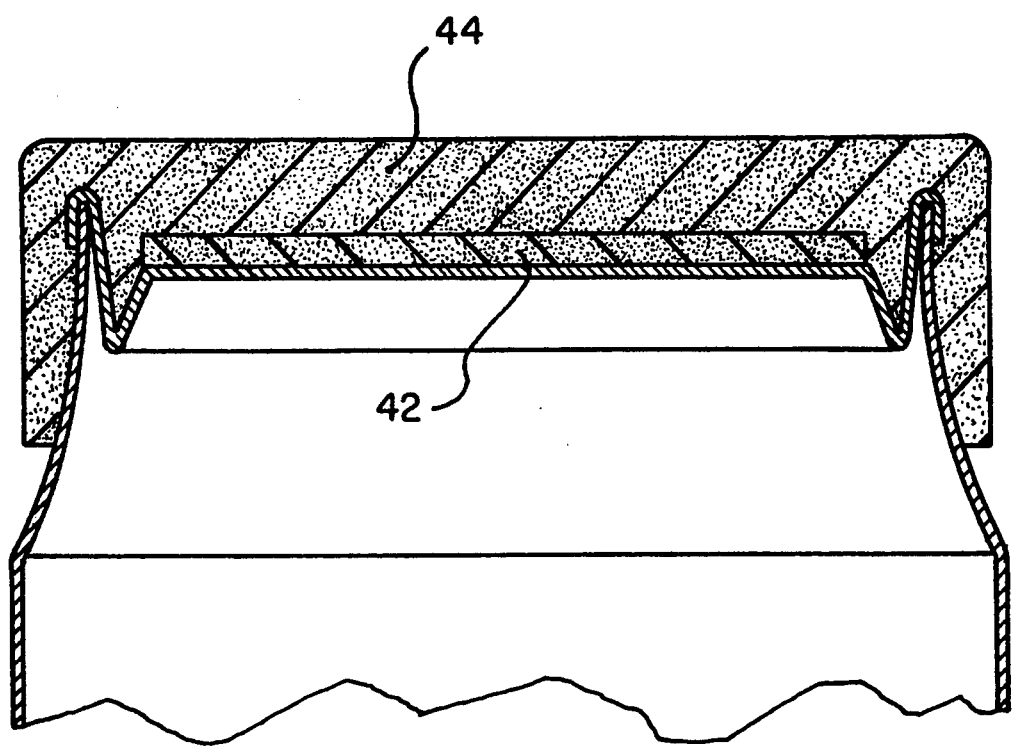
FIG. 4 is a cross sectional side view of an embodiment of the present invention having a one piece cap and a gasket.

In the preferred embodiment of the cap 12, the outer shell 28 and the interior liner 34 are molded as a single piece 44, as shown in FIG. 4 and a compression sensitive pad 42, made of a plastic, rubber, or like elastomeric material, is affixed thereto, interior to inner flange 38. The pad 42 is substantially circular and is approximately equal in diameter to the diameter of the can top 16 as measured from the inside edge of the annular groove 22. Pad 42 insures that the entire top 16 is in sealing contact with the cap 12. Pad 42 is designed so that it is soft enough to fill any air space between the cap 12 and the can top 16 caused by the presence of punch key 26. While an adequate seal is possible with the present invention even when the punch key 26 is left installed, it is preferred to remove the punch key 26 from the top 16 prior to placing the beverage cap 12 over the can 10, in order to establish an even better seal.

The object of such a tight fit for the cap 12 is to eliminate dead air space between the cap 12 and the can 10. The positive seal formed by the pad 42, in conjunction with the shell 28, and liner 34 insures that the beverage remaining in the can is substantially preserved in its original form. Additionally, a superior liquid seal is established, greatly reducing the risk of accidental spillage from the can.

While particular embodiments of the present invention have been illustrated and described herein, the present invention should not be limited to such illustrations and description. It should be apparent that changes and modifications may be incorporated and embodied as part of the present invention within the scope of the following claims.

What is claimed is:

1. A cap for a beverage can, said beverage can having a beaded rim, a substantially recessed top surface within the periphery of the beaded rim, and an annular groove adjacent to the beaded rim, comprising:
   an outer shell having an inner side, an outer side, an outer flange defining means adapted to enshroud the beaded rim of the beverage can, and an inner flange defining means adapted to mate with the annular groove; and
   a substantially flat and round elastomeric member affixed to the inner side of the outer shell, interior to the inner flange and defining means adapted to sealingly engage the recessed top surface of the beverage can.

2. The cap in accordance with claim 1 wherein the round member is made of rubber.

3. A beverage can cap for hermetically sealing an opened beverage can, said beverage can having a beaded rim, a recessed top, and an annular groove concentrically adjacent to the beaded rim, comprising:
   a resilient outer shell having an inner side, an outer side, an outer flange defining means adapted to enshroud the beaded rim of said beverage can, and an inner flange defining means adapted to mate to said annular groove; and
   a substantially flat and round elastomeric member affixed to the resilient outer shell, interior to said inner flange, and defining means adapted to fit within said recessed top to form a seal against the recessed top of the beverage can.

4. The cap in accordance with claim 3 wherein the elastomeric member is composed of rubber.

5. A reusable beverage can cap, said beverage can having a flat recessed top with an annular groove therein, comprising:
- a resilient outer shell having an inner surface, an outer surface, a flat upper surface, an annular flange, and an inner annular flange defining means adapted to sealingly mate with the annular groove of said flat recessed top; and
- a flat elastomeric inner member affixed to said inner surface concentric to said inner annular flange and defining means adapted to mate with the flat recessed top of the beverage can to form an airtight seal.

6. A cap for a beverage can, said beverage can having a beaded rim, a substantially recessed top surface within the periphery of the beaded rim, and an annular groove adjacent to the beaded rim, comprising:
- a resilient outer shell having an inner side, an outer side, a flange defining means adapted to enshroud the rim of the beverage can, and an inner flange integral to said outer shell defining means adapted to mate with the annular groove on the beverage can top; and
- a substantially flat and round elastomeric member affixed to the inner side of the resilient outer shell, interior to the inner flange, and defining means adapted to sealingly engage the recessed top of the beverage can.

* * * * *